United States Patent
Lee et al.

(10) Patent No.: US 10,930,945 B2
(45) Date of Patent: Feb. 23, 2021

(54) FUEL CELL SYSTEM AND CONTROL METHOD THEREOF

(71) Applicants: Hyundai Motor Company, Seoul (KR); Kia Motors Corporation, Seoul (KR)

(72) Inventors: Hyun Jae Lee, Seoul (KR); Dae Jong Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 255 days.

(21) Appl. No.: 15/822,867

(22) Filed: Nov. 27, 2017

(65) Prior Publication Data
US 2019/0115603 A1    Apr. 18, 2019

(30) Foreign Application Priority Data
Oct. 17, 2017  (KR) .................. 10-2017-0134761

(51) Int. Cl.
*H01M 8/04089* (2016.01)
*H01M 8/04302* (2016.01)
*H01M 8/04746* (2016.01)
*H01M 8/0438* (2016.01)

(52) U.S. Cl.
CPC ... *H01M 8/04104* (2013.01); *H01M 8/04302* (2016.02); *H01M 8/04388* (2013.01); *H01M 8/04753* (2013.01)

(58) Field of Classification Search
None
See application file for complete search history.

(56) References Cited

U.S. PATENT DOCUMENTS

| | | | |
|---|---|---|---|
| 7,943,265 B2 | 5/2011 | Katano | |
| 7,981,559 B2 | 7/2011 | Yoshida | |
| 7,985,507 B2 | 7/2011 | Kamihara | |
| 9,450,258 B2 | 9/2016 | Lee et al. | |
| 2006/0008689 A1 | 1/2006 | Yonekura et al. | |
| 2007/0243426 A1 | 10/2007 | Bono | |
| 2007/0243437 A1* | 10/2007 | Katano | H01M 8/04097 429/430 |

(Continued)

FOREIGN PATENT DOCUMENTS

| JP | 5113634 B2 | 1/2013 |
|---|---|---|
| KR | 2005-0010955 A | 1/2005 |

(Continued)

*Primary Examiner* — Basia A Ridley
*Assistant Examiner* — Heng M. Chan
(74) *Attorney, Agent, or Firm* — Mintz Levin Cohn Ferris Glovsky and Popeo, P.C.; Peter F. Corless (57) ABSTRACT

A fuel cell system and a control method thereof are provided. The control method includes acquiring a first pressure that corresponds to a pressure in an anode immediately before starting and determining a hydrogen supply target differential pressure value that corresponds to a pressure value boosted in the anode by hydrogen supplied to the anode when starting the system, based on an intensity of the acquired first pressure acquired. An opening degree of a hydrogen supply valve connected to the anode is then adjusted to supply sufficient hydrogen to boost the pressure in the anode that corresponds to the hydrogen supply target differential pressure value.

2 Claims, 5 Drawing Sheets

(56) References Cited

U.S. PATENT DOCUMENTS

2012/0251910 A1   10/2012  Matsumoto et al.
2016/0190620 A1    6/2016  Kwon et al.
2016/0336607 A1   11/2016  Lee et al.

FOREIGN PATENT DOCUMENTS

| KR | 2006-0123776 A | 12/2006 |
| KR | 2009-0058837 | 6/2009 |
| KR | 10-1459815 B1 | 11/2014 |
| KR | 2016-0015503 A | 2/2016 |
| KR | 2016-0078590 A | 7/2016 |
| KR | 10-1679970 B1 | 11/2016 |

* cited by examiner

FUEL CELL SYSTEM AND CONTROL METHOD THEREOF

CROSS-REFERENCE TO RELATED APPLICATION

This application is based on and claims the benefit of priority to Korean Patent Application No. 10-2017-0134761, filed on Oct. 17, 2017, the disclosure of which is incorporated herein in its entirety by reference.

Technical Field

The present disclosure relates to a fuel cell system and a control method thereof, and more particularly, to a fuel cell system capable of decreasing a consumption amount of hydrogen when starting the system and a control method thereof.

Background

A fuel cell generates power through a reaction of hydrogen introduced from an anode and oxygen introduced from a cathode. In the fuel cell system as described above, a hydrogen concentration in the anode in an early stage of the starting as well as performance of the fuel cell should be secured to prevent an internal catalyst from being damaged. As hydrogen in the anode moves toward the cathode by an electrochemical reaction of oxygen and hydrogen in a fuel cell stack during operation of the fuel cell, a pressure in the anode is decreased to become a negative pressure. In addition, after the fuel cell is shut-down, the pressure of the anode in a state in which the negative pressure is formed is slowly recovered to normal pressure.

Figure 1:
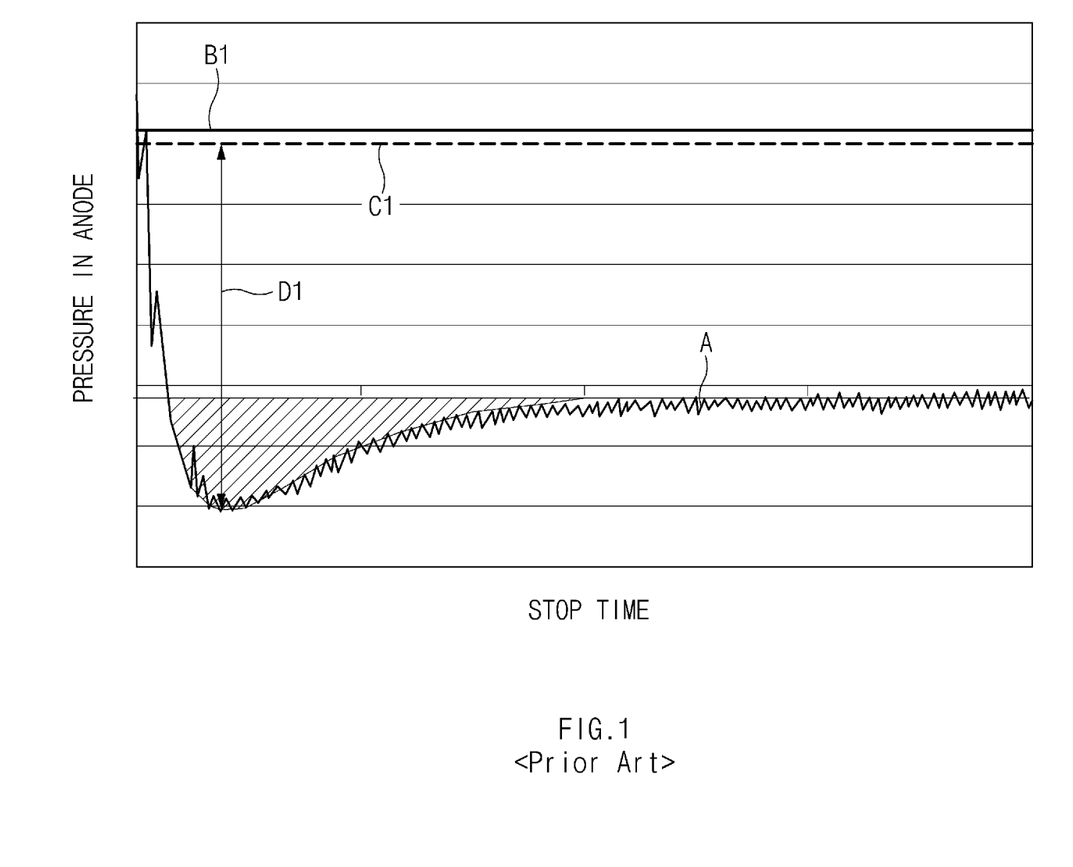
FIG. 1 is a graph applying the supply method of starting hydrogen according to the prior art.

As a supply method of starting hydrogen to a fuel cell according to the related art, a method of setting a hydrogen target pressure as an absolute pressure to satisfy a hydrogen concentration is applied. FIG. 1 is a graph showing the supply method of starting hydrogen according to the prior art. In the graph of FIG. 1, an X axis indicates an operation stop time of a fuel cell, and Y axis indicates a pressure in an anode. Further, A is a pressure in the anode immediately before starting, and B1 is the hydrogen target pressure that corresponds to the absolute pressure. D1 is a pressure boosted in the anode to reach the hydrogen target pressure, and C1 is a pressure in the anode after starting.

As illustrated in FIG. 1, since the absolute pressure is applied to the hydrogen target pressure (B1), hydrogen was supplied to cause a pressure to reach the fixed target pressure regardless of the pressure (A) in the anode immediately before starting. Therefore, when the pressure (A) in the anode immediately before starting is a negative pressure, unnecessary hydrogen is excessively supplied (see oblique line portions in FIG. 1).

The supply method of starting hydrogen according to the prior art is a method based on the assumption that a pressure in the anode immediately before starting is a normal pressure, and in an existing fuel cell vehicle, a pressure in a cathode was recovered to a normal pressure immediately after a shut-down or parking, and as a result, a pressure in an anode was also recovered to the normal pressure within a short time.

However, as a design of the fuel cell system and sealing of each component are improved to enhance the sealing of the cathode, unlike the prior art in which the pressure in the anode reached to the normal pressure within several minutes to at most about 20 minutes, a negative pressure was maintained for about 100 hours or more, the pressure in the anode immediately before starting was mostly in a negative pressure state. Therefore, when supplying starting hydrogen using the method according to the prior art, a consumption amount of hydrogen at the time of starting may be excessively supplied. Therefore, a supply method of hydrogen capable of minimizing a consumption amount of hydrogen in a fuel cell when starting the system without affecting durability of the fuel cell has been required.

SUMMARY

The present disclosure provides a fuel cell system and a control method thereof capable of minimizing a consumption amount of starting hydrogen in a pressure state of an anode immediately before starting, particularly, a negative pressure state, by reflecting the fact that formation of the negative pressure in the anode and a recovery pattern to a normal pressure are different based on an operation state or operation stop time of a fuel cell, or a sealing state of a cathode, and a configuration of the system.

An aspect of the present disclosure also provides a fuel cell system and a control method thereof capable of increasing actual driving fuel efficiency compared to the prior art by minimizing additional consumption of hydrogen caused by a negative pressure before starting when a fuel cell is used in a vehicle. An aspect of the present disclosure also provides a fuel cell system and a control method thereof capable of protecting a fuel cell stack and improving safety of operation of the fuel cell by preventing over-pressure of starting hydrogen.

According to an exemplary embodiment of the present disclosure, a control method of a fuel cell system may include: acquiring a first pressure that corresponds to a pressure in an anode immediately before starting; determining a hydrogen supply target differential pressure value that corresponds to a pressure value boosted in the anode by hydrogen supplied to the anode during starting, based on an intensity of the acquired first pressure; and adjusting an opening degree of a hydrogen supply valve connected to the anode to supply sufficient hydrogen to boost the pressure in the anode that corresponds to the hydrogen supply target differential pressure value.

According to another exemplary embodiment of the present disclosure, a fuel cell system may include: a pressure acquirer configured to acquire a first pressure that corresponds to a pressure in an anode immediately before starting; a hydrogen supplier including a hydrogen supply valve connected to the anode and configured to boost the pressure in the anode based on an opening degree of the hydrogen supply valve; and a controller configured to determine a hydrogen supply target differential pressure value that corresponds to a pressure value boosted in the anode by hydrogen supplied to the anode at the time of starting based on an intensity of acquired the first pressure and adjust the opening degree of the hydrogen supply valve to supply sufficient hydrogen to boost the pressure in the anode that corresponds to the hydrogen supply target differential pressure value, to the anode.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings.

First, the following exemplary embodiments described below are exemplary embodiments suitable for understanding technical features of a fuel cell system and a control method thereof according to the present disclosure. However, the present disclosure is not restrictively applied to exemplary embodiments to be described below or technical features of the present disclosure are not limited by exemplary embodiments to be described below, and various modifications may be made without departing from the scope or spirit of the present disclosure.

Figure 2:
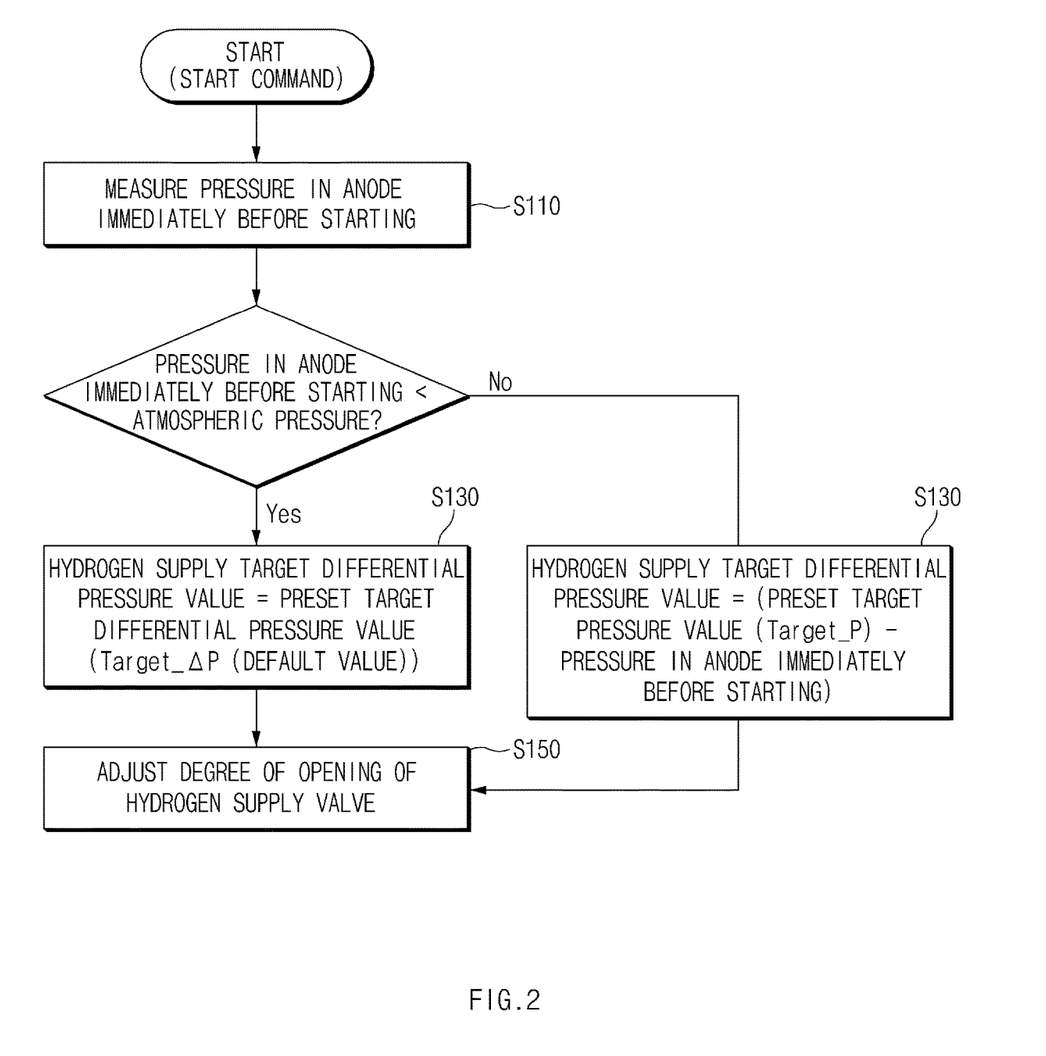
FIG. 2 is a flow chart of a control method of a fuel cell system according to an exemplary embodiment of the present disclosure.
Figure 3:
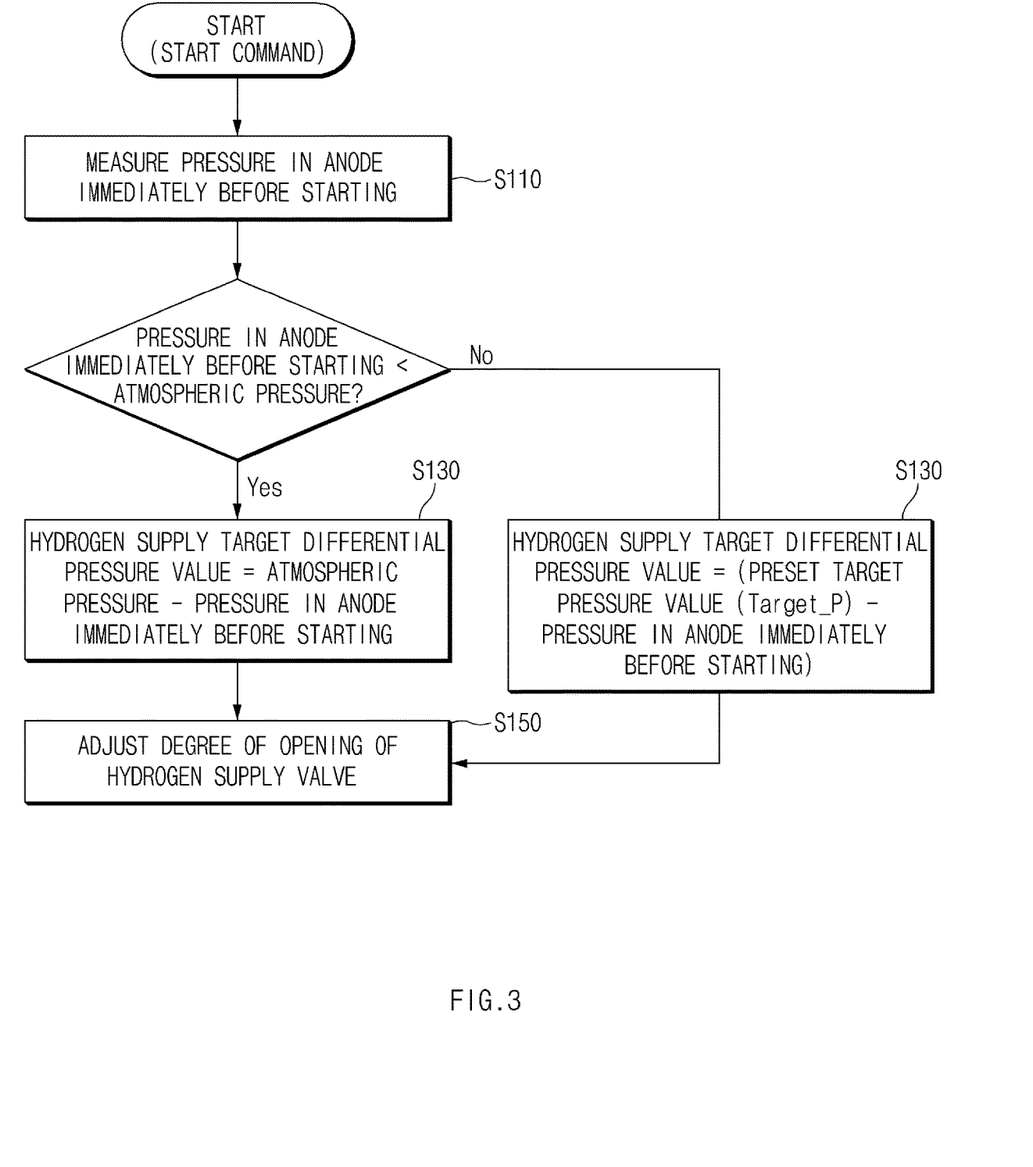
FIG. 3 is a flow chart of a control method of a fuel cell system according to another exemplary embodiment of the present disclosure.
Figure 4:
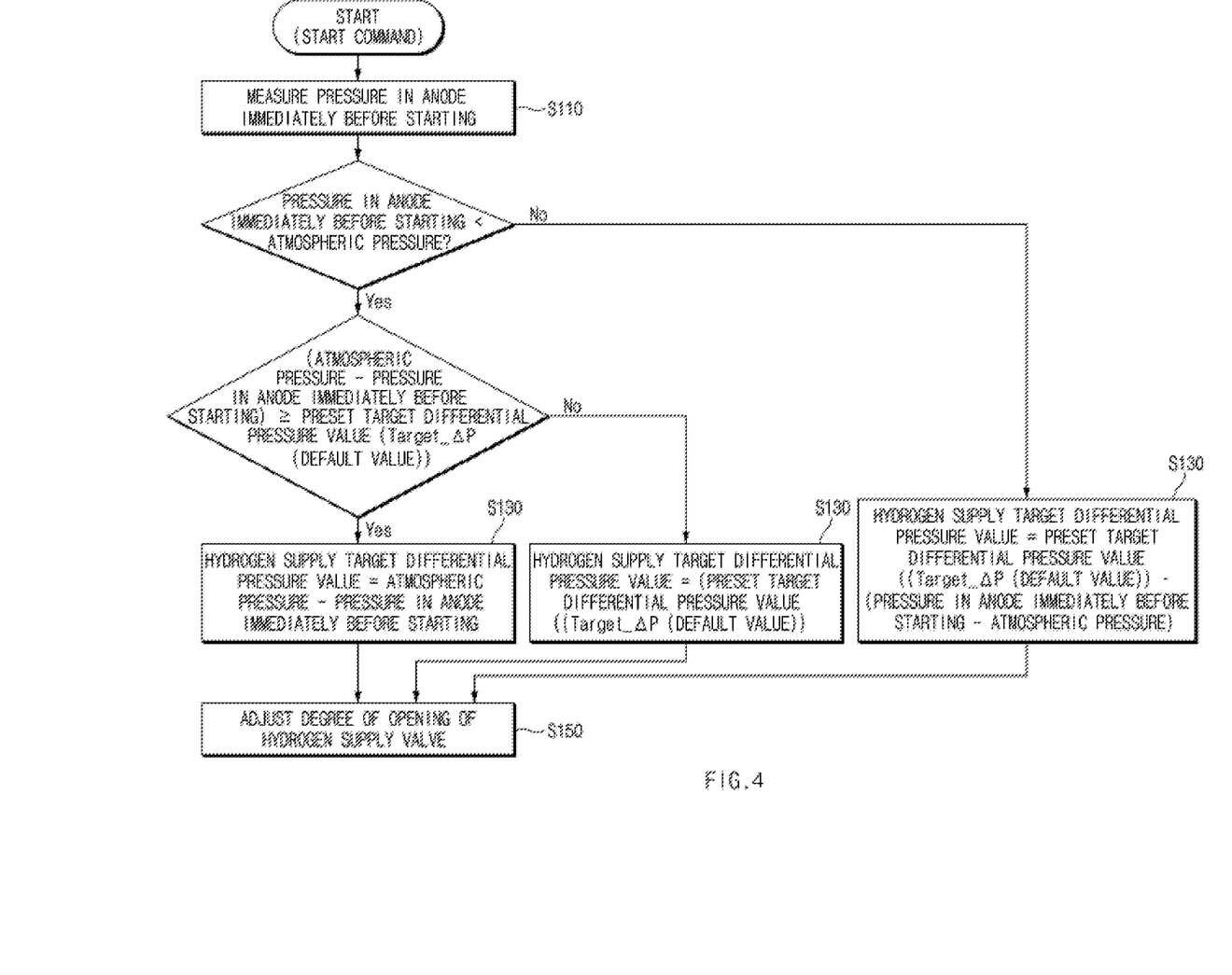
FIG. 4 is a flow chart of a control method of a fuel cell system according to another exemplary embodiment of the present disclosure.

Referring to FIGS. 2 to 4, a control method of a fuel cell system according to an exemplary embodiment of the present disclosure may include: an anode pressure acquiring step (S110), a hydrogen supply target differential pressure value determining step (S130), and a hydrogen supplying step (S150).

First, when a starting command of a fuel cell is input, the anode pressure acquiring step (S110) may be performed. In particular, the anode pressure acquiring step (S110) and the hydrogen supply target differential pressure value determining step (S130) may be performed immediately before starting an operation of the fuel cell system. Further, the hydrogen supplying step (S150) may be performed immediately before or simultaneously with the starting as described above. When the fuel cell is used in a vehicle, a state immediately before starting may refer to a state in which the vehicle is parked. In other words, the state of the fuel cell immediately before starting may refer to a state immediately before starting at the time of re-starting the vehicle after terminating driving of the vehicle and parking the vehicle.

Figure 5:
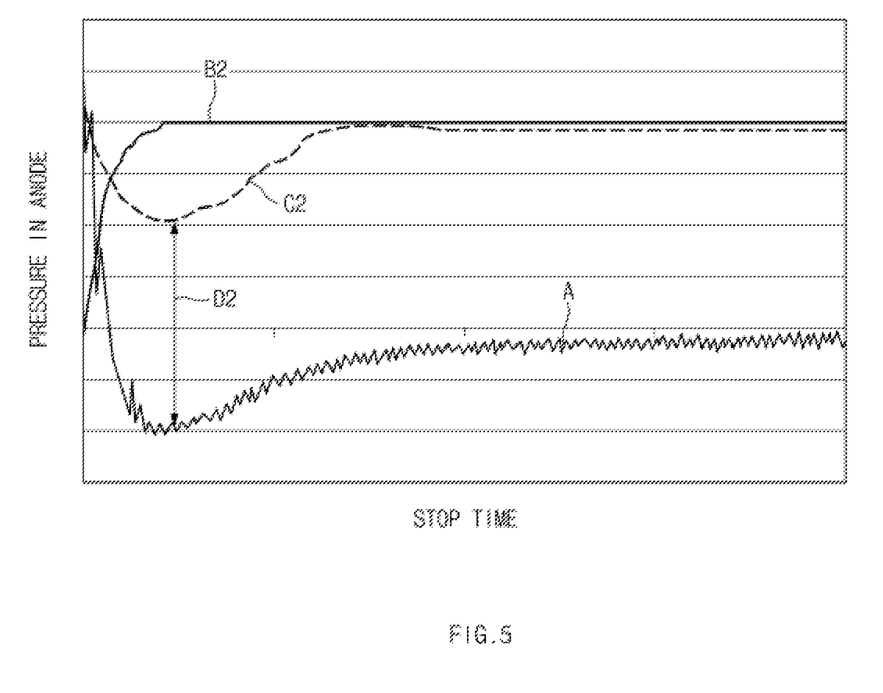
FIG. 5 is a graph in a case of supplying starting hydrogen using the control method of a fuel cell system according to an exemplary embodiment of the present disclosure.

In the anode pressure acquiring step (S110), the first pressure that corresponds to the pressure in the anode immediately before starting may be acquired. Particularly, as hydrogen in the anode moves toward the cathode by an electrochemical reaction of oxygen and hydrogen in a fuel cell stack during operation of the fuel cell, the pressure in the anode may be decreased to become a negative pressure (e.g., a pressure less than an atmospheric pressure). After the fuel cell is shut-down (e.g., after the vehicle is parked), the pressure in the anode in the state in which the negative pressure is formed may be slowly recovered to a normal pressure (e.g., a pressure equal to or greater than the atmospheric pressure), and a recovery rate may be changed based on a degree of introduction of external air to a cathode, that is, a level of sealing (see FIGS. 1 and 5A). More specifically, in the vehicle, the first pressure that corresponds to the pressure in the anode immediately before starting may be variously changed to, for example, a negative pressure, a normal pressure, and the like, based on the sealing degree of the cathode of the fuel cell, a driving state before stopping the vehicle, and a parking time.

Therefore, in the anode pressure acquiring step (S110) according to the present disclosure, when a starting command is input, the first pressure described above may be measured immediately before starting. In particular, to acquire the pressure in the anode, various methods may be used. For example, after providing a pressure sensor in the anode, the first pressure may be directly measured by the pressure sensor of the anode. The pressure sensor installed in the anode may be a pressure sensor configured to measure up to the negative pressure. Alternatively, the pressure in the anode may be indirectly measured by a pressure sensor installed in the cathode. In particular, when the pressure in the anode is recovered after parking and a parking time exceeds a predetermined time, the pressure in the cathode and the pressure in the anode may become similar to each other. At this time, the pressure in the anode may be indirectly measured by measuring the pressure in the cathode using the pressure sensor in the cathode.

As another method, the pressure in the anode in the stack may be estimated through a pressure of air, or the like, supplied to/discharged from the stack. For example, a supply flow rate of the air supplied to the stack through an air compressor may be measured by an air flow rate sensor, and thus, the pressure in the cathode may be estimated. Further, as described above, when the parking time exceeds a predetermined time, the pressure in the anode reaches the pressure in the cathode, the pressure in the anode may be estimated through the pressure in the cathode. However, an acquiring method of the pressure in the anode is not limited to the above-mentioned methods, but various methods in addition to the above-mentioned methods may also be used as long as the pressure in the anode may be measured or estimated.

In the hydrogen supply target differential pressure value determining step (S130), a hydrogen supply target differential pressure value that corresponds to a pressure value boosted in the anode by hydrogen supplied to the anode when starting the system may be determined based on an intensity of the acquired first pressure. In particular, at an early stage of starting, in view of durability to prevent a catalyst in the fuel cell from being damaged, there is a need to secure a hydrogen concentration in the anode as well as performance of the fuel cell. Therefore, during starting of the system, hydrogen may be supplied to the anode. The hydrogen supply target differential pressure value refers to a pressure boosted in the anode by hydrogen supplied to the anode at the time of starting.

In the hydrogen supply target differential pressure value determining step (S130), the hydrogen supply target differential pressure value may be determined based on the intensity of the acquired first pressure. In other words, as described above, since the first pressure may have various values immediately before starting, based on the level of a sealing system of the cathode, an operation stop time, and the like, a degree of the pressure to be boosted in the anode may be determined in consideration of the value of the first pressure as described above.

In the hydrogen supplying step (S150), sufficient hydrogen may supplied to boost the pressure in the anode that corresponds to the hydrogen supply target differential pressure value by adjusting an opening degree of a hydrogen supply valve connected to the anode. More specifically, when the hydrogen supply target differential pressure value is determined in the hydrogen supply target differential pressure value determining step (S130), the hydrogen supply valve may be opened until the pressure boosted in the anode reaches the hydrogen supply target differential pressure value. In addition, when the pressure reaches the hydrogen supply target differential pressure value, the opening degree of the hydrogen supply valve may be reduced or the hydrogen supply valve may be closed.

As described above, since the control method of a fuel cell system according to the exemplary embodiment in the present disclosure may reflect the fact that formation of the negative pressure in the anode and a recovery pattern to the normal pressure are different based on the operation state or the operation stop time of the fuel cell, or the sealing state of the cathode, and a configuration of the system by considering the pressure in the anode immediately before starting when determining the hydrogen supply target differential pressure value, a consumption amount of starting hydrogen may be minimized in a pressure state of the anode immediately before starting, particularly, a negative pressure state.

Therefore, when the fuel cell is used in the vehicle, since additional consumption of hydrogen caused by the negative pressure before starting is minimized, actual driving fuel efficiency may be increased compared to the existing method. Further, according to the present disclosure, since over-pressure of the starting hydrogen may be prevented, the fuel cell stack may be protected and operation safety of the fuel cell may be improved.

Meanwhile, hereinafter, the hydrogen supply target differential pressure value determining step (S130) will be described in detail with reference to FIGS. 2 to 4. Hereinafter, a case in which a preset reference pressure is an atmospheric pressure (e.g., about 100 kPa (1 Bar)) will be described by way of example. Further, the case in which the normal pressure is a pressure equal to or greater than the atmospheric pressure and the negative pressure is a pressure less than the atmospheric pressure will be described by way of example. However, the reference pressure applied to the present disclosure is not limited to the atmospheric pressure, but may be variously changed as long as it is a pressure serving as a basis capable of recognizing a pressure state in the anode.

First, in an exemplary embodiment illustrated in FIG. 2, a method of applying a first set pressure (Target_$\Delta$P (default value)), see FIG. 2) or second set pressure (Target_P, see FIG. 2), corresponding to a fixed value, based on whether the first pressure is a negative pressure, is used. Referring to FIG. 2, in the hydrogen supply target differential pressure value determining step (S130), when the first pressure is less than the preset reference pressure, the first set pressure that corresponds to a preset target differential pressure value (Target_$\Delta$P (default value)) may be determined as the hydrogen supply target differential pressure value. Further, in the hydrogen supply target differential pressure value determining step (S130), when the first pressure is equal to or greater than the reference pressure, a value calculated by subtracting the first pressure from the second set pressure that corresponds to a preset target pressure value (Target_P) of the anode may be determined as the hydrogen supply target differential pressure value.

In particular, when the first pressure acquired in the anode pressure acquiring step (S110) is the negative pressure, the hydrogen supply target differential pressure value may be the first set pressure. The first set pressure, which is the preset target differential pressure value, may be a fixed value. Therefore, in the exemplary embodiment of FIG. 2, when the first pressure is the negative pressure, the first set pressure may be applied uniformly. For example, when the preset target differential pressure value is about 20 kPa, and the pressure in the anode immediately before starting is about 80 kPa, the hydrogen supply target differential pressure value may be about 20 kPa. Therefore, sufficient hydrogen may be supplied to boost the pressure in the anode by about 20 kPa.

Meanwhile, when the first pressure acquired in the anode pressure acquiring step (S110) is the normal pressure, the hydrogen supply target differential pressure value may be the value calculated by subtracting the first pressure from the second set pressure (Target_P) of the anode. Particularly, the second set pressure (Target_P), which is the preset target pressure value of the anode, may be a fixed value. Therefore, when the first pressure is the normal pressure, the second set pressure may be applied uniformly. For example, when the second set pressure is about 120 kPa, and the internal pressure of the anode immediately before starting is about 105 kPa, the hydrogen supply target differential pressure value may be about 15 kPa, which is a value calculated by subtracting 105 kPa from 120 kPa. Therefore, sufficient hydrogen may be supplied to boost the pressure in the anode by about 15 kPa.

Furthermore, in another exemplary embodiment illustrated in FIG. 3, a fixed value may be applied based on whether a first pressure is a negative pressure, similarly in the exemplary embodiment described above, but when the first pressure is less than a preset reference pressure value, there is a difference between another exemplary embodiment and the exemplary embodiment described above. Referring to FIG. 3, in the hydrogen supply target differential pressure value determining step (S130), when the first pressure is less than the preset reference pressure, a value calculated by subtracting the first pressure from the preset reference value may be determined as a hydrogen supply target differential pressure value. Further, when the first pressure is equal to or greater than the reference pressure, a value calculated by subtracting the first pressure from a second set pressure corresponding to a preset target pressure value (Target_P) of the anode may be determined as the hydrogen supply target differential pressure value.

Specifically, when the first pressure is less than the reference pressure, the value calculated by subtracting the first pressure from the reference value may be determined as the hydrogen supply target differential pressure value. More specifically, when the first pressure acquired in the anode pressure acquiring step (S110) is a negative pressure, the hydrogen supply target differential pressure value may be determined to be the value calculated by subtracting the first pressure from atmospheric pressure, that is, a differential pressure at a level reaching the atmospheric pressure.

In another exemplary embodiment illustrated in FIG. 4, a method of variably applying the hydrogen supply target differential pressure value based on whether the first pressure is a negative pressure and whether a difference between the atmospheric pressure and the first pressure is equal to or greater than a first set pressure (Target_ΔP (default value)) is used. Referring to FIG. 4, in the hydrogen supply target differential pressure value determining step (S130), when the first pressure is less than a preset reference pressure, the hydrogen supply target differential pressure value may be determined by comparing a difference value between the first pressure and the reference pressure with the first set pressure that corresponds to the preset target differential pressure value (Target_ΔP (default value)).

When the first pressure is less than the reference pressure and the difference value between the first pressure and the reference pressure is equal to or greater than the first set pressure, the hydrogen supply target differential pressure value may be determined to be a value calculated by subtracting the first pressure from the reference pressure. In particular, when the first pressure acquired in the anode pressure acquiring step (S110) is a negative pressure and a value calculated by subtracting the first pressure from the atmospheric pressure is equal to or greater than the first set pressure (Target_ΔP (default value)), the hydrogen supply target differential pressure value may be determined to be the value calculated by subtracting the first pressure from atmospheric pressure, that is, a differential pressure at a level reaching the atmospheric pressure.

For example, when the first pressure is about 60 kPa and the first set pressure is about 15 kPa, since the value calculated by subtracting the first pressure from the atmospheric pressure is greater than the first set pressure, the hydrogen supply target differential pressure value may be about 40 kPa. Further, when the first pressure is less than the reference pressure and the difference value between the first pressure and the reference pressure is less than the first set pressure, the hydrogen supply target differential pressure value may be determined to be the first set pressure.

When the first pressure acquired in the anode pressure acquiring step (S110) is a negative pressure, and the value calculated by subtracting the first pressure from the atmospheric pressure is less than the first set pressure, the hydrogen supply target differential pressure value may be determined to be the first set pressure, that is, the present target differential pressure value. For example, when the first pressure is about 90 kPa and the first set pressure is about 15 kPa, since the value calculated by subtracting the first pressure from the atmospheric pressure is about 10 kPa, which is less than the first set pressure, the hydrogen supply target differential pressure value may be about 15 kPa, which is the first set pressure.

Meanwhile, referring to FIG. 4, in the hydrogen supply target differential pressure determining step (S130), when the first pressure is equal to or greater than the preset reference pressure, the hydrogen supply target differential pressure value may be determined to be a value calculated by subtracting a difference value between the first pressure and the reference pressure from the first set pressure. Specifically, when the first pressure is equal to or greater than the atmospheric pressure, the hydrogen supply target differential pressure value may be determined to be a value calculated by subtracting a value calculated by subtracting the atmospheric pressure from the first pressure from the preset target differential pressure value. For example, when the first pressure is about 105 kPa and the first set pressure is about 15 kPa, the hydrogen supply target differential pressure value may be about 10 kPa, obtained by subtracting 5 kPa, which is a value calculated by subtracting the atmospheric pressure from 105 kPa, from 15 kPa.

As described above, in the exemplary embodiment illustrated in FIG. 2, when determining the hydrogen supply target differential pressure value, fixed values are respectively applied based on whether the pressure in the anode immediately before starting the system is a negative pressure, but in another exemplary embodiment illustrated in FIG. 4, when determining the hydrogen supply target differential pressure value, the hydrogen supply target differential pressure value may be variably changed using the pressure in the anode immediately before starting.

When determining the hydrogen supply target differential pressure value at the time of re-starting the fuel cell, the methods in the exemplary embodiments illustrated in FIGS. 2 to 4 may be appropriately applied, and the method in the exemplary embodiment in which the hydrogen supply target differential pressure value is minimized may be applied between these two methods in the exemplary embodiments. Therefore, in a range in which a hydrogen concentration of the anode is secured without affecting durability of the fuel cell, the consumption amount of hydrogen may be minimized.

FIG. 5 is a graph illustrating a pressure in an anode and a hydrogen supply target differential pressure value based on time when applying the control method of a fuel cell system according to the present disclosure. In the graph of FIG. 5, an X axis indicates an operation stop time of a fuel cell, and Y axis indicates the pressure in the anode. Further, A is a first pressure, B2 is a hydrogen supply target differential pressure value, and C2 is a pressure in the anode after starting the system, boosted by supplying hydrogen. D2, which is a pressure boosted in the anode by supplying hydrogen based on the determined B2 value, is equal to B2.

Referring to FIG. 5, since B2 is determined based on the pressure A (first pressure) in the anode immediately before starting, it may be possible to minimize a problem that hydrogen is excessively supplied, particularly when the pressure A in the anode immediately before starting is a negative pressure. In other words, when the pressure is the negative pressure immediately before starting, the pressure boosted in the anode is small, compared to D1 of FIG. 1, which is a pressure boosted in the anode according to the prior art. Therefore, according to the present disclosure, since the consumption amount of hydrogen when starting may be minimized, an effect of improving actual driving fuel efficiency may be obtained.

Meanwhile, a fuel cell system according to another exemplary embodiment of the present disclosure may include a pressure acquirer, a hydrogen supplier, and a controller. The controller may be configured to operate the pressure acquirer and the hydrogen supplier. Additionally, the pressure acquirer may be a type of sensor. The pressure acquirer may be configured to acquire a first pressure, which is a pressure in an anode immediately before starting. In particular, a method of acquiring the pressure in the pressure acquirer is not limited. For example, a pressure sensor may be configured to sense the pressure in the anode, but the method of acquiring the pressure is not limited thereto.

The hydrogen supplier may include a hydrogen supply valve connected to the anode and boost the pressure in the anode based on an opening degree of the hydrogen supply valve. Meanwhile, the controller may be configured to determine a hydrogen supply target differential pressure value that corresponds to a pressure value boosted in the anode by hydrogen supplied to the anode when starting the system based on an intensity of the first pressure acquired in the pressure acquirer, and adjust the opening degree of the hydrogen supply valve to supply sufficient hydrogen to boost the pressure in the anode that corresponds to the hydrogen supply target differential pressure value, to the anode.

In particular, when the first pressure is less than a preset reference pressure, the controller may be configured to determine the hydrogen supply target differential pressure value to be a first set pressure that corresponds to a preset target differential pressure value, and when the first pressure is equal to or greater than the reference pressure, the controller may be configured to determine the hydrogen supply target differential pressure value to be a value calculated by subtracting the first pressure from a second set pressure that corresponds to a preset target pressure value of the anode (see FIG. 2).

Meanwhile, when the first pressure is less than the preset reference pressure, the controller may be configured to compare a difference value between the first pressure and the reference pressure with the first set pressure that corresponds to the preset target differential pressure value to determine the hydrogen supply target differential pressure value. When the first pressure is equal to or greater than the preset reference pressure, the controller may be configured to determine the hydrogen supply target differential pressure value to be a value calculated by subtracting the difference value between the first pressure and the reference pressure from the first set pressure (see FIG. 4).

As described above, since the control method of a fuel cell system according to the exemplary embodiment in the present disclosure may reflect the fact that formation of the negative pressure in the anode and the recovery pattern to the normal pressure are different based on the operation state or the operation stop time of the fuel cell, or the sealing state of the cathode, and a configuration of the system by considering the pressure in the anode immediately before starting at the time of determining the hydrogen supply target differential pressure value, a consumption amount of starting hydrogen may be minimized in the pressure state of the anode immediately before starting, particularly, the negative pressure state.

Therefore, when the fuel cell is used in the vehicle, since additional consumption of hydrogen caused by the negative pressure before starting is minimized, actual driving fuel efficiency may be increased compared to the existing method in the prior art. Further, according to the present disclosure, since over-pressure of the starting hydrogen is prevented, it may be possible to protect the fuel cell stack and improve operation safety of the fuel cell.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A control method of a fuel cell system, comprising:
    acquiring, by a controller, a first pressure that corresponds to a pressure in an anode immediately before starting the system;
    determining, by the controller, a hydrogen supply target differential pressure value that corresponds to a pressure value boosted in the anode by hydrogen supplied to the anode during starting; and
    adjusting, by the controller, an opening degree of a hydrogen supply valve connected to the anode to supply sufficient hydrogen to boost the pressure in the anode by a pressure that corresponds to the hydrogen supply target differential pressure value,
    wherein when the first pressure is less than a reference pressure and a difference value between the first pressure and the reference pressure is equal to or greater than a first set pressure that corresponds to a preset target differential pressure value, the hydrogen supply target differential pressure value is determined to be a value calculated by subtracting the first pressure from the reference pressure,
    wherein when the first pressure is less than the reference pressure and the difference value between the first pressure and the reference pressure is less than the first set pressure, the hydrogen supply target differential pressure value is determined to be the first set pressure, and
    wherein when the first pressure is equal to or greater than the reference pressure, a value calculated by subtracting the difference value between the first pressure and the reference pressure from the first set pressure is determined as the hydrogen supply target differential pressure value.

2. A fuel cell system, comprising:
a pressure sensor configured to acquire a first pressure that corresponds to a pressure in an anode immediately before starting;
a hydrogen supplier including a hydrogen supply valve connected to the anode and configured to boost the pressure in the anode based on an opening degree of the hydrogen supply valve; and
a controller configured to determine a hydrogen supply target differential pressure value that corresponds to a pressure value boosted in the anode by hydrogen supplied to the anode when starting the system, and adjust the opening degree of the hydrogen supply valve to supply sufficient hydrogen to boost the pressure in the anode by a pressure that corresponds to the hydrogen supply target differential pressure value, to the anode,
wherein when the first pressure is less than a reference pressure and a difference value between the first pressure and the reference pressure is equal to or greater than a first set pressure that corresponds to a preset target differential pressure value, the controller is configured to determine the hydrogen supply target differential pressure value to be a value calculated by subtracting the first pressure from the reference pressure,
wherein when the first pressure is less than the reference pressure and the difference value between the first pressure and the reference pressure is less than the first set pressure, the controller is configured to determine the hydrogen supply target differential pressure value to be the first set pressure, and
wherein when the first pressure is equal to or greater than the reference pressure, the controller is configured to determine the hydrogen supply target differential pressure value to be a value calculated by subtracting the difference value between the first pressure and the reference pressure from the first set pressure.

* * * * *